Figure 1:
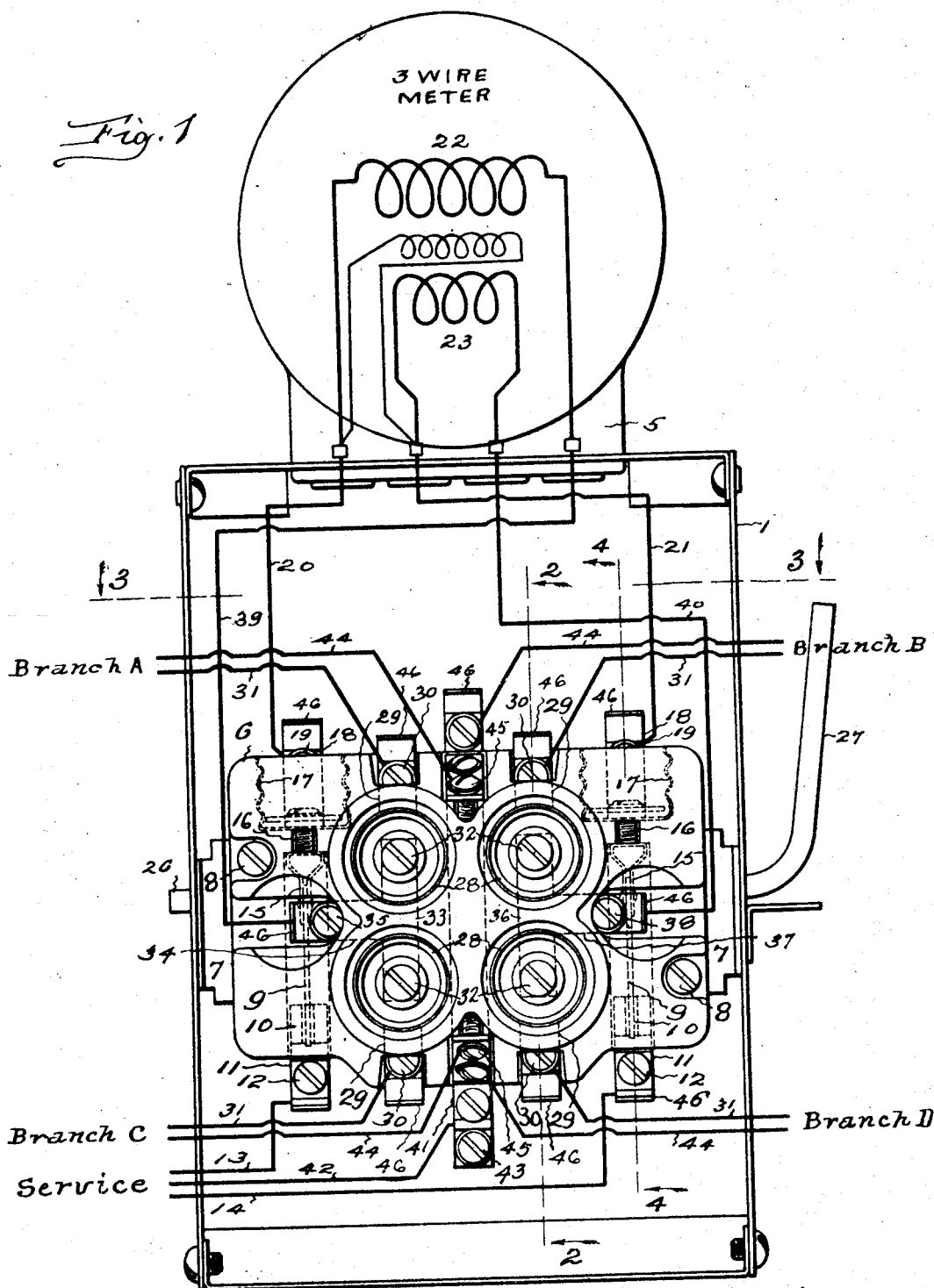

June 24, 1930. J. SACHS 1,767,259
PROTECTED ELECTRIC METER SERVICE APPURTENANCE
Original Filed Feb. 15, 1924 3 Sheets—Sheet 2
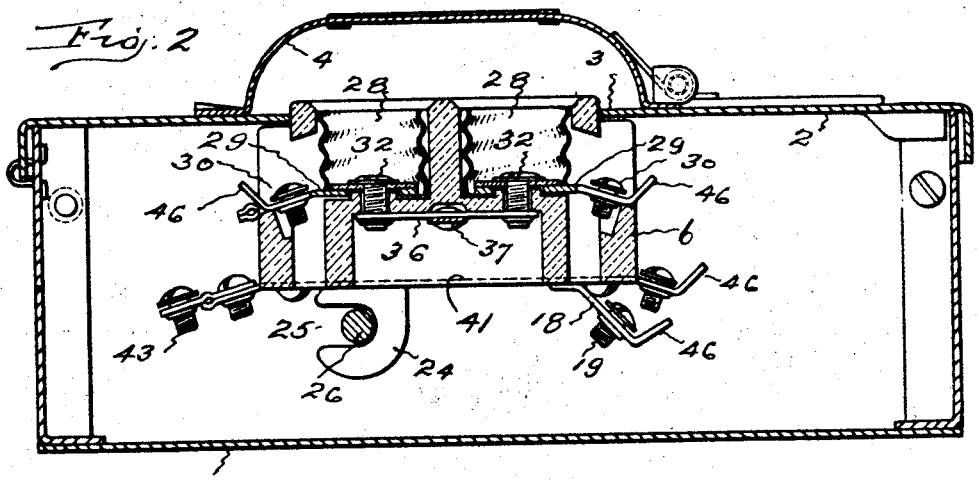
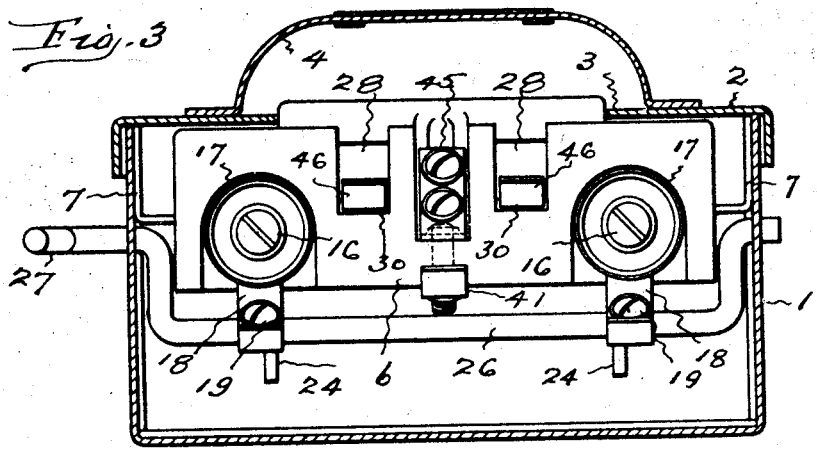
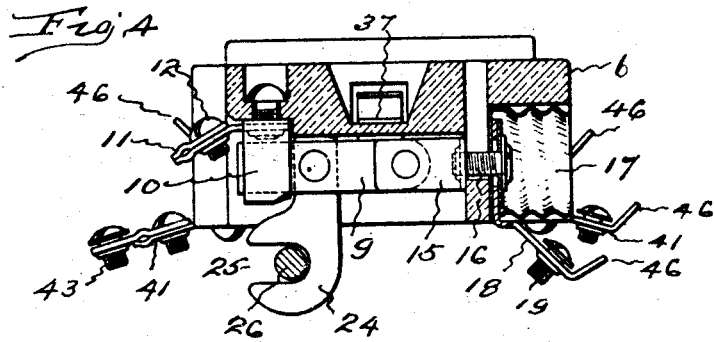
INVENTOR
Joseph Sachs, by
Harry R. Williams
atty.

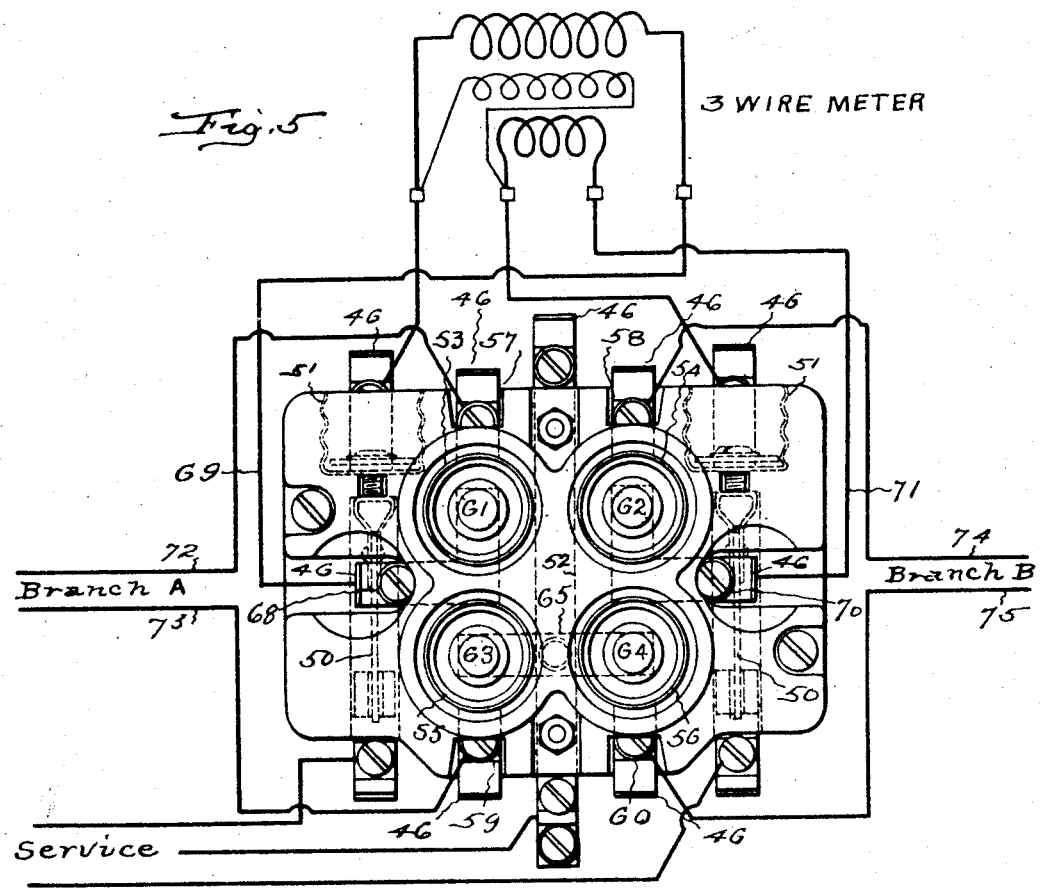
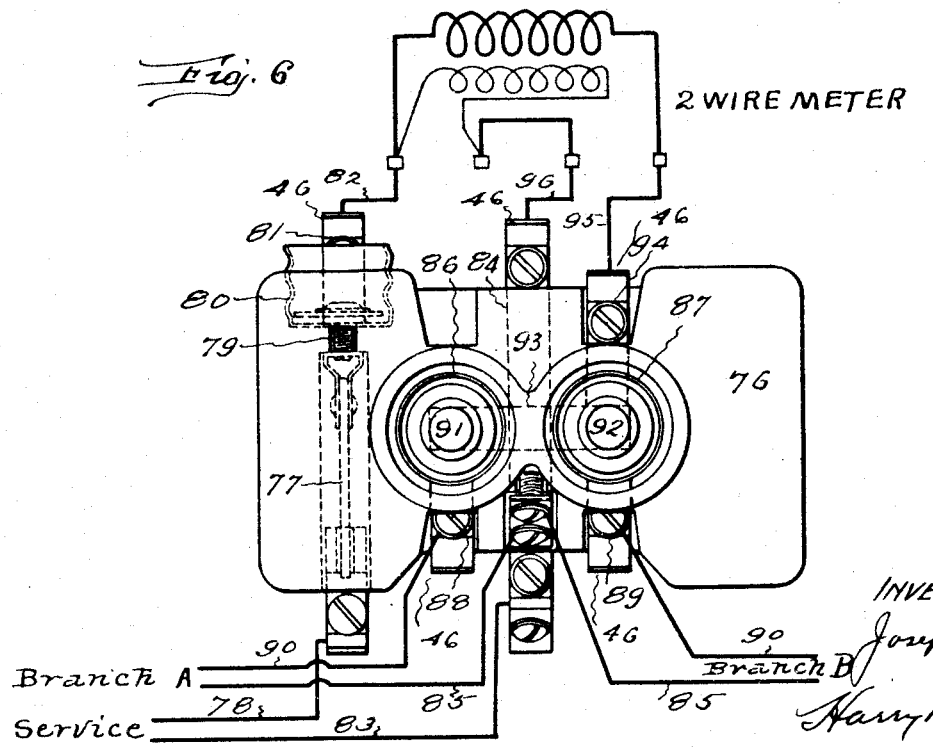

Patented June 24, 1930

1,767,259

UNITED STATES PATENT OFFICE

JOSEPH SACHS, OF WEST HARTFORD, CONNECTICUT

PROTECTED ELECTRIC-METER-SERVICE APPURTENANCE

Application filed February 15, 1924, Serial No. 693,010. Renewed January 11, 1929.

Meter service appurtenances comprising a box enclosing all of the live parts for the protection of life and property and insurance against tampering and current theft, and containing a single block on which are mounted means for the ready connection of the load and service circuit wires and meter leads, an externally operated service switch, and cut-outs on the service and load sides of the meter connections, with the switch and service cut-outs arranged so as to be inaccessible from the exterior until the box is unsealed and the cover is opened, and the load side cut-outs readily accessible upon opening a lid or supplemental cover on the box, have been produced, such being particularly described in my application for Protected Electric Meter Service Appurtenance, Serial No. 579,178, filed August 2, 1922. In the prior constructions referred to, however, the load side cut-outs were arranged to protect the main load side circuit wires only. The present improvement is designed to provide an appurtenance of this nature with means whereby a distribution of the current on the load side may be readily effected.

The object of the invention is the production of an appurtenance of the class mentioned with means for the attachment and protection of a plurality of load side branch circuits, that is, to provide a protecting box with a block having means for the connection of the meter leads, the main circuit wires and a plurality of branch circuit wires, a service side externally operated switch, one or more service side cut-outs, and one or more cut-outs in each of the plurality of branch circuits, all of which elements are arranged on the single block and are enclosed and protected by the box with the switch and service side cut-outs inaccessible until the cover of the box is opened and the branch cut-outs accessible upon the opening of a lid or supplemental cover on the box, this construction resulting in a saving in the cost of manufacture and a reduction in the cost of installation, and effecting an economy of space required for the appurtenances and their connections.

The device is adapted for use with two-wire or three-wire service circuits, and two or more branch circuits each of which branch circuits may be single fused or double fused as desired.

In the accompanying drawings Fig. 1 shows a front view of an appurtenance embodying the invention, the front cover being omitted. Fig. 2 shows a section on the plane indicated by the dotted line 2—2 on Fig. 1. Fig. 3 shows a section on the plane indicated by the dotted line 3—3 on Fig. 1. Fig. 4 shows a section of the block on the plane indicated by the dotted line 4—4 on Fig. 1. Fig. 5 shows a front view of the block shown in Figs. 1 to 4 but having different electrical arrangements and wiring connections. Fig. 6 shows a front view of an alternative form of block embodying the invention.

The box 1 is usually made from sheet metal with a cover 2 arranged to be opened and closed and sealed when closed. The cover near the middle has an opening 3 and a lid 4 is provided for covering the said opening, this lid being movably connected with the cover. As shown the lid 4 has hinges at the top which connect it with the cover 2. One end of the box shown has an opening fitted to the meter terminal chamber 5 and the other walls have the necessary openings for the entrance of the service wires and the exit of the branch wires.

The base 6 is a unitary piece of insulation. This base is designed to be mounted on brackets 7 fastened to the sides of the box and be held by screws 8 that pass through the ends of the base into the brackets. The brackets support the base with a space between it and the back of the box. The base is so positioned with relation to the cover 2 and the opening 3 therein that the said opening is entirely closed by the base when the cover is in its closed position.

The arrangement first shown has connections for a three-wire service circuit with the two outside service wires fused and the neutral solid, and four two-wire branch circuits with a single fuse in each branch and a solid neutral. In recesses in the back face of the base are switch blades 9 the swinging ends of which are adapted to engage with or disengage from clips 10 that are connected with straps 11 provided with binding screws 12 by which the ends of the outside wires 13 and 14 of the service circuit are connected with the switch. The other ends of the switch blades are pivoted to brackets 15 which are electrically connected with fuse contacts so mounted on the base 6 as to be inaccessible through the cover opening 3 when the cover is closed. As illustrated the said brackets 15 are engaged by screws 16 the heads of which provide the center contacts of screw plug sockets in the upper edge of the base. The threaded metallic shells 17 of these sockets are adapted to receive the common form of screw plug fuse, and they are connected with terminal strips 18 provided with binding screws 19 by means of which the meter leads 20 and 21, the former to the current coil 22 of the meter and the latter to the current coil 23 of the meter, are connected.

Fastened to the switch blades are plates 24 of insulation which have slots 25. Extending across the box back of the base and passing through the slots in these plates is a switch operating crank rod 26 that has one end extended on the outside of the box to provide an operating handle 27. By turning this handle the switch may be thrown and the circuit on the service side of the meter be opened and closed when the cover of the box is shut and sealed. Fuses in the sockets 17 protect the circuit on the service side of the meter, which fuses are inaccessible when the cover of the box is closed.

Mounted on the front face of the base are fuse contacts or sockets which are located so as to be accessible through the opening 3 in the cover 2. As shown these sockets include screw threaded shells 28 adapted to receive common screw plug fuses. It will be obvious that when the lid 4 is raised the sockets will be exposed for the insertion or removal of the fuses. Each of these metallic screw threaded shells is connected with a conducting strip 29 the outer end of which is provided with a binding screw 30 by which one of the wires 31 of each of the branch circuits A B C and D is connected. These binding screws 30 are so located as to be inaccessible through the cover opening 3. In the center of each socket is the usual screw contact 32 adapted to be engaged by the center terminal of a screw plug fuse. The center contacts of the sockets on one side are connected by a conducting strip 33 which is electrically connected with a lug 34 having a binding screw 35. On the other side the center contacts of the two sockets are connected by a strip 36 which is in electrical contact with a lug 37 which has a binding screw 38. Attached to the lug 34 by the binding screw 35 is the end of a meter lead 39 that is adapted to be electrically connected with one end of the current coil 22 of the meter. Connected to the lug 37 by the binding screw 38 is the end of a meter lead 40 which is adapted to be electrically connected with an end of the meter current coil 23.

Extending across the back of the base at the center is a conducting strip 41. The neutral service wire 42 is connected with this strip by the binding screw 43. Electrically connected with this strip by suitable binding screws and lugs 45 are the ends of the wires 44 of the branch circuits A B C D. The several conducting strips may be provided or formed with projecting lugs 46 for the convenient attachment of meter testing apparatus leads.

With this arrangement in use current from the service mains flows through the inaccessible service side switches and fuses to the current coils of the meter and then from the current coils back to the center terminals of the fuse sockets on the front of the base and through the shells of these sockets to one wire of each of the branches. From the other wire of each of the branches the current passes through the solid neutral strip and to the neutral service wire. When this simple, cheap and compact block having all the required elements mounted on the single base is secured in a box the branch fuses on the load side of the meter are at the front where they can be readily reached if desired for removal or renewal, and these load side fuses are arranged so that there is one in each of the plurality of branch circuits for protecting them. The service side fuses are at the top where they can be reached when the cover of the box is open, but cannot be reached when the cover is shut, and the switch is at the back where it can not be tampered with unless the cover is open but can be thrown at any time from the exterior when the box is closed. Owing to the compactness of the block the box containing it may be made smaller than those previously provided for installations having the same protecting means for a plurality of branch circuits, and yet leave ample room within the box for manipulating the switch and fuses, and making the necessary circuit and testing connections. When the cover is closed and sealed no live parts on the service side of the meter can be reached or tampered with.

The circuit controlling elements mounted on the single base may be varied, as hereinafter mentioned, but there always are on the load side of the meter, connections for a plurality of branches with a fuse in each branch that is accessible when the box is installed and is sealed. The block comprising the base and conducting elements is a unitary structure and the base itself may, as illustrated, be made of one piece of insulation, or may be formed of more than one piece without departing from the invention.

In the device with the connections above described there is provision for a single fuse in each of the branch circuits. The construction, however, readily lends itself to provision for double fusing the branch circuits. The arrangement illustrated in Fig. 5 is for a three-wire service circuit with switch and cut-outs on the service side of the meter connections, and two two-wire branch circuits on the load side of the meter connections, with provision for fusing both legs of each branch, the branch fuses being accessible through the opening in the cover of the box. In this latter case the switch blades 50 on the back and the plug fuse sockets 51 at the top edge of the base, also the neutral strip 52 on the back are arranged and connected exactly as before described. The plug fuse shells 53, 54, 55 and 56 in the sockets on the front of the base are respectively connected with lugs 57, 58, 59 and 60, as in the other case. When double fusing the center contacts 63 and 64 of the sockets 55 and 56 are connected by a strip 65 which is connected with the neutral strip 52, while the center contact 61 of the socket 53 is connected with the lug 68 to which the meter coil lead 69 is connected, and the center contact 62 of the socket 54 is connected with a lug 70 to which the meter coil lead 71 is connected. With this method of making the connections the leg 72 of the branch A is protected by a fuse in the socket 53, and the leg 73 of the branch A is protected by a fuse in the socket 55. The leg 74 of the branch B is protected by a fuse in the socket 54, and the leg 75 of the branch B is protected by a fuse in the socket 56.

When the connections are to be made for a two-wire service circuit and two branches with a single fuse in each branch, the base 76, as shown in Fig. 6, may be provided with a switch blade 77 that is adapted to open and close connection with the service wire 78. The other end of the switch is held by a screw 79 which forms the center contact of the screw plug fuse socket 80 in the upper edge of the block, this socket being connected to lug 81 to which one of the meter leads 82 is attached. The other service wire 83 is connected to the solid neutral strip 84, and the legs 85 of the branches A and B are also connected with this neutral strip. The threaded screw plug sockets 86 and 87 in the front of the base are respectively connected with the lugs 88 and 89 to which the legs 90 of the branches A and B are connected. These connections are all the same as previously set forth for the similar parts. In this case, however, the center contacts 91 and 92 of the sockets 86 and 87 are connected by a strip 93 and this strip joined to a lug 94 to which the meter lead 95 is attached. The potential meter lead 96 of the meter indicated is connected to the neutral strip 84. With these connections the current flows through the switch and fuse on the service side and after passing through the meter is divided and flows through each of the load side fuses to the branch lines.

The illustrated embodiment of the invention shows and describes a block comprising an insulating base which may be unitary or composite with the service side fuse receptacles, the branch fuse receptacles, and the switch mounted on different surfaces of the base. Without departing from the invention, however, these elements may be located on other angularly related, opposing or offset surfaces, or surfaces in different planes from those shown. The end to be attained is to so arrange the conducting parts on the insulating supporting means and so construct the enclosing casing, that while the appliance provides an enclosed externally operated meter service switch, with means for protecting the meter against tampering, it also provides distribution or branching connections for a plurality of branch circuits, having excess current protective means in each branch, with the relation of the service side fuses and branch fuses to the enclosing casing such that the service side fuses are normally inaccessible, while the branch fuses are readily accessible, and when desired, as for testing the meter or renewing the service side fuses, the service side parts may be rendered accessible.

The appliance is a complete unit ready to be installed in connection with a meter without requiring additional work or connections to be made to correlate in the manner described, the meter protective feature, the inaccessible main service side features, the accessible branching or distributing features, the externally operative switching means, and such testing facilities as are desired.

The testing means provided will naturally vary with the particular electrical arrangement of the service side and branch fuses, switch and other connecting parts on the base.

The test contacts 46 at the meter connected ends of the service side fuse receptacles, at the load circuit ends of the branch fuse receptacles, at the load ends of the leads from the meter current coils, and at the ends of the neutral strip, are adapted to be used as contacts for the ready connection of jumper clips and testing circuit instrument clips. Other test contacts may be provided as desirable. In making the ordinary tests the contacts shown are usually sufficient. One of the tests commonly employed to check an installed meter is to put it in series with a standard meter and resistance load, and connect these across the line from which current is supplied. To ensure service to the consumer's load during the test it is usual to jump or connect a bypass around the meter so that the service is continued through the jumper. The path through the installed meter can then be opened and the load side end of the current coil of the meter freed without interruption of current flow to the load.

To jump around the meter one end of a bypass may be connected to the test contact at the meter connected end of the service side fuse receptacle. The other end of this jumper has requisite means for connecting it to the load circuit connected end of each of the branch fuse receptacles in that leg of the circuit. After the jumper is connected around each series coil of the meter and the branch fuses in that leg, then the load end terminal of the series coil is freed by disconnecting each of the branch fuses which have been jumped. The service then passes directly from the service side main fuse receptacles to the branch circuit wire of each of the branch circuits normally protected by these fuses. With such connections the series coil of the installed meter is disconnected at the load end, but remains connected to the circuit at the service end.

After the series coil terminal has been freed as described, the test circuit, including the standard meter and the resistance load, may be completed to include the installed meter so that this test circuit starting with the connection of the service end of the series coil to one leg of the supply circuit, continues through the standard meter and resistance load, which is connected to the other leg of the supply circuit. When the test has been completed the test circuit connections are removed, branch fuses reconnected and the jumpers removed, then the appliance is again in its normal service condition. In making a three-wire test the connections described are merely duplicated.

The invention claimed is:—

1. In a main and distribution fuse block, the combination of an insulating base adapted to be mounted in fixed relation to a support, the said base having a plurality of faces adapted for mounting electrical parts and respectively facing in different directions substantially at right angles to each other, means forming a current path across the base and including a pair of fuse receiving contacts mounted on one of the said faces, the said means being adapted to be connected between an incoming service wire and the service side of a meter, a plurality of pairs of fuse receiving contacts additional to those aforesaid and mounted on a different face of the base, means for connecting one contact of each of the last said pairs in series with the said current path and with the meter at the load side of the latter, and a plurality of terminals corresponding in number to the last said pairs of contacts for respectively connecting the remaining contacts of the last said pairs with branch load circuit wires.

2. In a main and distribution fuse and switch block, the combination of an insulating base adapted to be mounted in fixed relation to a support, the said base having a plurality of faces adapted for mounting electrical parts and respectively facing in different directions substantially at right angles to each other, means forming a current path across the base and including a switch on the back face of the base and a pair of fuse receiving contacts mounted on one of the said faces substantially at right angles to the back face, the said means being adapted to be connected between an incoming service wire and the service side of a meter, a plurality of pairs of fuse receiving contacts additional to those aforesaid and mounted on the front face of the base, means for connecting one contact of each of the last said pairs in series with the said current path and with the meter at the load side of the latter, and a plurality of terminals corresponding in number to the last said pairs of contacts for respectively connecting the remaining contacts of the last said pairs with branch load circuit wires.

3. A protected switch and fuse device comprising in combination, a box having an openable front cover with an opening therein, means whereby the cover may be sealed in closed position, an insulating base in the box adapted for mounting electrical parts, the said base being positioned in the box so as to close the said opening in the cover when the cover is closed, means forming a current path across the base and including a pair of fuse receiving contacts mounted on the base so as to be inaccessible through the said cover opening, the said means being adapted to be connected between an incoming service wire and the service side of a meter, a plurality of pairs of fuse receiving contacts additional to those aforesaid and mounted on the front face of the base so as to be accessible through the said opening in the cover when the cover is closed, means for connecting one contact of each of the last said pairs in series with the said current path and with the meter at the load side of the latter, and a plurality of terminals inaccessible through the cover opening and corresponding in number to the last said pairs of contacts for respectively connecting the remaining contacts of the last said pairs with branch load circuit wires.

4. A protected switch and fuse device comprising in combination, a box having an openable front cover with an opening therein, means whereby the cover may be sealed in closed position, an insulating base in the box having a plurality of faces adapted for mounting electrical parts, the said base being positioned in the box so as to close the said opening in the cover when the cover is closed, means forming a current path across the base and including a switch on the back face of the base and a pair of fuse receiving contacts mounted on a face of the base other than the back face, the said means being inaccessible through the said cover opening and being adapted to be connected between an incoming service wire and the service side of a meter, a plurality of pairs of fuse receiving contacts additional to those aforesaid and mounted on the front face of the base so as to be accessible through the said opening in the cover when the cover is closed, means for connecting one contact of each of the last said pairs in series with the said current path and with the meter at the load side of the latter, and a plurality of terminals inaccessible through the cover opening and corresponding in number to the last said pairs of contacts for respectively connecting the remaining contacts of the last said pairs with branch load circuit wires.

5. A protected switch and fuse device comprising in combination, a box having an openable front cover with an opening therein, means whereby the cover may be sealed in closed position, an insulating base in the box having a plurality of faces adapted for mounting electrical parts and respectively facing in different directions substantially at right angles to each other, the said base being positioned in the box so as to close the said opening in the cover when the cover is closed, means forming a current path across the base and including a pair of fuse receiving contacts mounted on one of the said faces other than the front face, the said means being inaccessible through the said cover opening and being adapted to be connected between an incoming service wire and the service side of a meter, a plurality of pairs of fuse receiving contacts additional to those aforesaid and mounted on the front face of the base so as to be accessible through the said opening in the cover when the cover is closed, means for connecting one contact of each of the last said pairs in series wtih the said current path and with the meter at the load side of the latter, and a plurality of terminals corresponding in number to the last said pairs of contacts for respectively connecting the remaining contacts of the last said pairs with branch load circuit wires.

6. A protected switch and fuse device comprising in combination, a box having an openable front cover with an opening therein, means whereby the cover may be sealed in closed position, an insulating base in the box having a plurality of faces adapted for mounting electrical parts and respectively facing in different directions substantially at right angles to each other, the said base being positioned in the box so as to close the said opening in the cover when the cover is closed, means forming a current path across the base and including a switch on the back face of the base and a pair of fuse receiving contacts mounted on one of the said faces substantially at right angles to the back face, the said means being inaccessible through the said cover opening and being adapted to be connected between an incoming service wire and the service side of a meter, a plurality of pairs of fuse receiving contacts additional to those aforesaid and mounted on the front face of the base so as to be accessible through the said opening in the cover when the cover is closed, means for connecting one contact of each of the last said pairs in series with the said current path and with the meter at the load side of the latter, and a plurality of terminals corresponding in number to the last said pairs of contacts for respectively connecting the remaining contacts of the last said pairs with branch load circuit wires.

7. In a main and distribution fuse block, the combination of an insulating base adapted to be mounted in fixed relation to a support, means forming two current paths extending across the base from the bottom to the top thereof, one of the said paths including a pair of fuse receiving contacts and both of the said paths being adapted to be respectively connected between two incoming service wires and the service side of a meter, two groups of pairs of fuse receiving contacts additional to those aforesaid and mounted on the front face of the base, the contacts forming the two groups being located at opposite sides of the vertical central plane of the base, two conducting members serving to respectively connect one contact of each pair of the two said groups in series with the said current paths and in series with the meter at the load side thereof, each of the said conducting members being provided with a wire connecting terminal located at the corresponding side of the base, and a plurality of terminals corresponding in number to the last said pairs of contacts for respectively connecting the remaining contacts of the last said pairs with branch load circuit wires.

8. In a main and distribution fuse and switch block, the combination of an insulating base adapted to be mounted in fixed relation to a support, means forming two current paths extending across the base and each including a switch and at least one of them including a pair of fuse receiving contacts, the said paths being adapted to be respectively connected between two incoming service wires and the service side of a meter, a centrally located conductor forming a third unfused current path extending across the block from the bottom to the top thereof and also adapted to be connected with an incoming service wire, two groups of pairs of fuse receiving contacts additional to the aforesaid fuse contacts and mounted on the front face of the base, the contacts forming the two groups being located at opposite sides of the vertical central plane of the base, two conducting members serving to respectively connect one contact of each pair of the two said groups in series with the respective current paths and in series with the meter at the load side thereof, terminals connected with the said centrally located conductor at the upper and lower ends thereof for the connection of a plurality of branch circuit wires corresponding in number to the last said pairs of fuse contacts, and a plurality of terminals corresponding in number to the last said pairs of fuse contacts for respectively connecting the remaining contacts of the said pairs with the remaining wires of the said branch circuits, the last said terminals being respectively located adjacent the upper and lower edges of the base and in close proximity to the terminals at the ends of the centrally located conductor.

9. In a main and distribution fuse and switch block, the combination of an insulating base adapted to be mounted in fixed relation to a support, means forming two current paths extending across the base and each including a switch and at least one of them including a pair of fuse receiving contacts, the said paths being adapted to be respectively connected between two incoming service wires and the service side of a meter, a centrally located conductor forming a third unfused current path extending across the block from the bottom to the top thereof and also adapted to be connected with an incoming service wire, two groups of pairs of fuse receiving contacts additional to the aforesaid fuse contacts and mounted on the front face of the base, the contacts forming the two groups being located at opposite sides of the vertical central plane of the base, two conducting members serving to respectively connect one contact of each pair of the two said groups in series with the respective current paths and in series with the meter at the load side thereof, each of the said conducting members being provided with a wire connecting terminal located at the corresponding side of the base, terminals connected with the said centrally located conductor at the upper and lower ends thereof for the connection of a plurality of branch circuit wires corresponding in number to the last said pairs of fuse contacts, and a plurality of terminals corresponding in number to the last said pairs of fuse contacts for respectively connecting the remaining contacts of the said pairs with the remaining wires of the said branch circuits, the last said terminals being respectively located adjacent the upper and lower edges of the base and in close proximity to the terminals at the ends of the centrally located conductor.

JOSEPH SACHS.